(12) United States Patent
Kameyama et al.

(10) Patent No.: US 6,342,934 B1
(45) Date of Patent: *Jan. 29, 2002

(54) POLARIZER LIGHTING DEVICE AND LIQUID CRYSTAL DISPLAY

(75) Inventors: Tadayuki Kameyama; Hironori Motomura; Naoki Takahashi, all of Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,078

(22) Filed: Apr. 29, 1998

(30) Foreign Application Priority Data

May 16, 1997 (JP) .............................. 9-143310

(51) Int. Cl.⁷ ............................................ G02F 1/1335
(52) U.S. Cl. ........................... 349/98; 349/96; 349/117; 349/119
(58) Field of Search .............................. 349/96, 98, 117, 349/119, 102

(56) References Cited

U.S. PATENT DOCUMENTS

| | | | |
|---|---|---|---|
| 4,725,460 A | | 2/1988 | Matsuo et al. ................. 428/1 |
| 5,332,522 A | | 7/1994 | Chen et al. ............. 252/299.01 |
| 5,506,704 A | | 4/1996 | Broer et al. |
| 5,550,661 A | * | 8/1996 | Clark et al. .................... 359/73 |
| 5,721,603 A | * | 2/1998 | De Vaan et al. ............ 349/194 |
| 5,737,044 A | * | 4/1998 | Van Haaren et al. ......... 349/61 |
| 5,825,444 A | * | 10/1998 | Broer et al. .................. 349/98 |
| 5,841,494 A | * | 11/1998 | Hall ............................. 349/98 |
| 5,928,801 A | * | 7/1999 | Broer et al. ................... 349/69 |

FOREIGN PATENT DOCUMENTS

| | | | |
|---|---|---|---|
| EP | 0 606 939 | 7/1994 | |
| EP | 0 606 940 | 7/1994 | |
| JP | 1-133003 | 5/1989 | ............ G02B/5/30 |
| JP | 6-281814 | 10/1994 | ............ G02B/5/30 |
| WO | WO 96/02016 | 1/1996 | |
| WO | WO 96/10774 | 4/1996 | |

OTHER PUBLICATIONS

J. Phys. D: Appl. Phys., vol. 8, 1975.
Patent Abstracts of Japan, vol. 013, No. 382 (P–923), Aug. 24, 1989.

* cited by examiner

*Primary Examiner*—William L. Sikes
*Assistant Examiner*—Tarifur R. Chowdhury
(74) *Attorney, Agent, or Firm*—Sughrue Mion, PLLC

(57) ABSTRACT

Disclosed are a polarizer comprising a circularly polarized light separation layer in which two or more cholesteric liquid crystal polymer layers are laminated with each other in a close contact state in a long-short order based on a center wavelength of reflected light, said circularly polarized light separation layer changing in helical pitch in the direction of thickness, a retardation layer arranged on the long-wavelength side of said center wavelength, and a polarizing plate containing a dichroic substance and disposed on the retardation layer, as so desired; a lighting device in which a surface light source is arranged on the circularly polarized light separation layer side of said polarizer; and a liquid crystal display in which said polarizer or said lighting device is arranged on the visual back face side of a liquid crystal cell, directing the retardation layer side thereof to the liquid crystal cell.

13 Claims, 2 Drawing Sheets

POLARIZER LIGHTING DEVICE AND LIQUID CRYSTAL DISPLAY

FIELD OF THE INVENTION

The present invention relates to a polarizer in which cholesteric liquid crystal polymer layers are laminated with each other in a close contact state, which is thin in thickness, improves luminance and the angle of visibility of liquid crystal displays and the like, and inhibits changes in color with visual angle changes, and a lighting device and a liquid crystal display using the same.

BACKGROUND OF THE INVENTION

Conventionally, circularly polarized light separation layers each comprising two or more cholesteric liquid crystal polymer layers different in helical pitch which are adhered to each other through an adhesive layer have been known in JP-A-1-133003 (the term "JP-A" as used herein means an "unexamined published Japanese patent application"). The lamination of cholesteric liquid crystal layers aims at the enlargement of the wavelength region of reflected light. That is to say, the wavelength ($\lambda$) of light reflected from a cholesteric liquid crystal layer is represented by $n_o p\cos\theta < \lambda < n_e p\cos\theta$, based on the refractive indexes of ordinary light and extraordinary light by birefringence ($n_o$, $n_e$) and the helical pitch (p), taking the angle of incidence as $\theta$. The wavelength region $\lambda$ of the reflected light is narrower than that of visible light, so that light transmitted through a monolayer cholesteric liquid crystal layer and light reflected therefrom look colored, as called selective reflection or circularly polarized light dichromatism. Accordingly, different types of cholesteric liquid crystal polymer layers are laminated to enlarge the wavelength region of the reflected light, thereby forming circularly polarized light separation layers showing neutral tints.

However, the lamination of the cholesteric liquid crystal polymer layers by means of the adhesive layer has the problems of increasing the thickness and increasing the reflection loss due to the difference in refractive indexes in an adhesion interface. Further, the mere lamination of the cholesteric liquid crystal polymer layers only adds the wavelengths of the reflected light. Accordingly, in order to form circularly polarized light separation layers, for example, showing reflection characteristics over the entire region of visible light, it is usually necessary to combine three or more types of cholesteric liquid crystal polymer layers so that the wavelength region of the reflected light extends to the entire region of visible light.

On the other hand, means for improving the efficiency for light utilization in liquid crystal displays by polarizing light from light sources through circularly polarized light separation layers to realize bright display have been known in JP-A-59-127019, JP-A-61-122626, JP-A-63-121821, JP-A-3-45906, JP-A-6-324333, JP-A-7-35925 and JP-A-7-36025.

However, although light vertically (front) incident on circularly polarized light separation layers is transmitted as right (left) circularly polarized light without changes in color, light obliquely incident thereon has the problem that it is transmitted as elliptically polarized light to cause changes in color (coloring). Thus, when such circularly polarized light separation layers are applied to liquid crystal display layers, obliquely transmitted light suffers changes in color based on both the liquid crystal cells and the circularly polarized light separation layers. As a result, the changes in color are combined when visually observed, which causes great changes in color with visual angle changes, resulting in a decline in visibility.

SUMMARY OF THE INVENTION

It is therefore an object of the present invention to provide a polarizer which is thin in thickness, has no reflection loss caused by intervention of an adhesive layer, and has a circularly polarized light separation layer wide in the reflection wavelength region which does not give changes in color to vertically transmitted light and can inhibit changes in color of obliquely transmitted light, thus being able to form a liquid crystal display in which light is efficiently transmitted through a polarizing plate as neutral tints to provide an excellent efficiency for light utilization and changes in color caused by a liquid crystal cell can also be inhibited to give an excellent brightness and a wide angle of visibility.

According to the present invention, there is provided a polarizer comprising a circularly polarized light separation layer in which two or more cholesteric liquid crystal polymer layers are laminated with each other in a close contact state in a long-short order based on a center wavelength of reflected light, the circularly polarized light separation layer changing in helical pitch in the direction of thickness, a retardation layer arranged on the long-wavelength side of the center wavelength, and a polarizing plate containing a dichroic substance and disposed on the retardation layer, if desired and Necessary.

The present invention further provides a lighting device in which a surface light source is arranged on the circularly polarized light separation layer side of the polarizer, and a liquid crystal display in which the polarizer or the lighting device is arranged on the visual back face side of a liquid crystal cell, directing the retardation layer side thereof to the liquid crystal cell.

According to the present invention, the circularly polarized light separation layer is obtained in which reflection loss caused by intervention of an adhesive layer and an increase in thickness are avoided, the polarizer can be obtained in which vertically incident light is transmitted as circularly polarized light without changes in color and can be linearly polarized through the retardation layer, and elliptically polarized light changed in color by oblique transmission through the circularly polarized light separation layer is also compensated in color through the retardation layer, thereby providing light giving neutral tints when it is transmitted through the polarizing plate, and the liquid crystal display having a wide angle of visibility, producing no changes in color, and having an excellent brightness and a good visibility can be obtained.

DETAILED DESCRIPTION OF THE INVENTION

Figure 1:
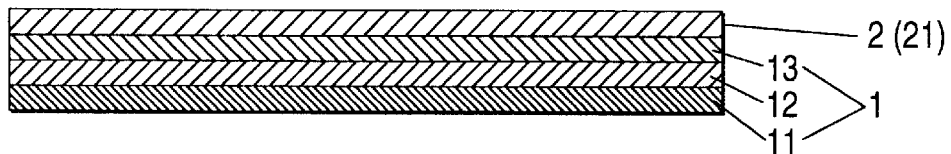
FIG. 1 is a cross sectional view showing a polarizer embodying the present invention.

The polarizer according to the present invention comprises a circularly polarized light separation layer in which two or more cholesteric liquid crystal polymer layers are laminated with each other in a close contact state in a long-short order based on a center wavelength of reflected light, the circularly polarized light separation layer changing in helical pitch in the direction of thickness, a retardation layer arranged on the long-wavelength side of the center wavelength, and a polarizing plate containing a dichroic substance and disposed on the retardation layer, if desired and necessary.

Examples of the above-mentioned polarizers are shown in FIGS. 1 to 4. The reference number 1 indicates a circularly polarized light separation layer, the reference numbers 12 and 13 indicate cholesteric liquid crystal polymer layers thereof, and the reference number 11 indicates a supporting substrate. Further, the reference number 2 indicates a retardation layer, the reference number 21 indicates a ¼ wavelength plate, and the reference number 22 indicates a compensation plate. Furthermore, the reference number 3 indicates a polarizing plate.

The circularly polarized light separation layer used in the present invention is one in which two or more cholesteric liquid crystal polymer layers are laminated with each other in the close contact state in the long-short order based on the center wavelength of reflected light, the circularly polarized light separation layer changing in helical pitch in the direction of thickness.

The above-mentioned circularly polarized light separation layer can be produced, for example, by pressing two or more oriented cholesteric liquid crystal polymer layers on each other under heating. For such a heat pressing treatment, an appropriate method can be employed such as a method of heat pressing cholesteric liquid crystal polymer layers by means of a heat pressing means such as a roll laminator at a temperature equal to or higher than a glass transition temperature to lower than an isotropic phase transition temperature.

For inhibiting changes in color of transmitted light caused by visual angle changes, the circularly polarized light separation layer is one in which the cholesteric liquid crystal polymer layers are laminated with each other in the long-short order based on the center wavelength of reflected light. However, this allows to contain two or more cholesteric liquid crystal polymer layers having the same helical pitch.

In the above-mentioned case, one or two or more cholesteric liquid crystal polymer layers different in helical pitch intervene between the cholesteric liquid crystal polymer layers having the same helical pitch in the long-short order based on the above-mentioned center wavelength.

As the cholesteric liquid crystal polymer layers, appropriate ones separating natural light into right circularly polarized light and left circularly polarized light by Grandjean orientation as transmitted light and reflected light can be used. The cholesteric liquid crystal polymer layer can be obtained as a monolayer product such as a film, or as a multilayer product in which it is supported with a plastic film or the like.

It is preferred that the cholesteric liquid crystal polymer layers are oriented as uniformly as possible. The uniformly oriented cholesteric liquid crystal polymer layers provide reflected light having no scattering, so that they are advantageous for the enlargement of the angle of visibility in liquid crystal displays, particularly suitable for the formation of direct-view liquid crystal displays directly observed also from oblique directions.

In the above, the lamination of the cholesteric liquid crystal layers aims at the enlargement of the wavelength region of the separation function. That is to say, a monolayer cholesteric liquid crystal layer usually has a limitation on the wavelength region showing selective reflection (circularly polarized light dichromatism), and the limitation is in a wide range extending to a wavelength region of about 100 nm in some cases. However, even such a wavelength range does not extend to the entire region of visible light desired when applied to liquid crystal displays. It is therefore aimed that the cholesteric liquid crystal layers different in selective reflection (reflection wavelength) are laminated with each other to enlarge the wavelength region showing the circularly polarized light dichromatism.

By the way, several types of cholesteric liquid crystal polymer layers having a center wavelength of selective reflection ranging from 300 to 900 nm are laminated by using a combination of layers reflecting circularly polarized light in the same direction and differing in helical pitch, thereby being able to efficiently form a circularly polarized light separation layer which can cover a wide wavelength region such as the visible light region.

In the above-mentioned case, the lamination of the cholesteric liquid crystal layers reflecting the circularly polarized light in the same direction makes a phase state of circularly polarized light reflected by each layer uniform to prevent the generation of a different polarized state in each wavelength region and to increase the amount of polarized light in an available state.

There is no particular limitation on the cholesteric liquid crystal polymers, and appropriate polymers may be used. Accordingly, various polymers can be used such as main chain type or side chain type polymers in which conjugate linear atomic groups (mesogens) are introduced into main chains or side chains of the polymers.

The cholesteric liquid crystal polymers having larger retardation (Δn) become wider in the wavelength region of selective reflection, and are preferably used in respect to a decrease in the layer number and allowance to a wavelength shift at a wide view angle. As the liquid crystal polymers, polymers having a glass transition temperature of 30 to 150° C. are preferably used from the standpoints of handling and stability of orientation at operating temperatures.

By the way, examples of the above-mentioned main chain type liquid crystal polymers include polymers such as polyesters, polyamides, polycarbonates and polyesterimides, in which mesogen groups comprising para-substituted cyclic compounds are linked by spacer moieties for giving flexibility if necessary.

Examples of the side chain type liquid crystal polymers include polymers having polyacrylates, polymethacrylates, polysiloxanes or polymalonates as main chains and low molecular weight liquid crystal compounds (mesogen groups) comprising para-substituted cyclic compounds as side chains through spacer moieties comprising conjugate linear atomic groups (mesogens) if necessary, nematic liquid crystal polymers containing low molecular weight chiralities, chiral component-introduced liquid crystal polymers, and mixed liquid crystal polymers of nematic and cholesteric polymers.

As described above, even the polymers having the para-substituted cyclic compounds imparting nematic orientation comprising para-substituted aromatic units or substituted cyclohexyl ring units such as azomethine, azo, azoxy, ester, biphenyl, phenylcyclohexane and bicyclohexane forms can be converted to polymers having cholesteric orientation by introducing appropriate chiral components comprising compounds having asymmetric carbon atoms or low molecular weight chiral agents (JP-A-55-21479 and U.S. Pat. No. 5,332,522). Terminal substituent groups at the para-positions of the para-substituted cyclic compounds may be appropriate groups such as cyano, alkyl and alkoxyl groups.

The spacer moieties include, for example, methylene chains —$(CH_2)_n$— and polyoxymethylene chains —$(CH_2CH_2O)_m$. The number of repetition of structural units forming the spacer moieties is appropriately determined by the chemical structure of the mesogen moieties. In general, n is 0 to 20, and preferably 2 to 12, for the methylene chains, and m is 0 to 10, and preferably 1 to 3, for the polyoxymethylene chains.

The above-mentioned main chain type liquid crystal polymers can be prepared by appropriate methods based on ordinary polymer synthesis, for example, by copolymerizing component monomers by radical polymerization, cationic polymerization or anionic polymerization. The side chain type liquid crystal polymers can also be prepared by appropriate methods such as monomer addition polymerization of polymerizing by radical polymerization monomers in which mesogen groups are introduced into vinyl monomers for forming main chains such as acrylates or methacrylates by spacer groups if necessary, addition polymerization of vinyl-substituted mesogen monomers by Si—H bonds of polyoxymethyl-silylenes in the presence of platinum catalysts, introduction of mesogen groups by esterification using phase transfer catalysts through functional groups added to main polymers, and polycondensation of monomers in which mesogen groups are introduced into a part of malonic acid by spacer groups if necessary and diols.

In the above, copolymers comprising monomer units represented by the following general formula (a) and monomer units represented by the following general formula (b), particularly copolymers comprising 60 to 95% by weight of monomer units represented by the following general formula (a) and 40 to 5% of monomer units represented by the following general formula (b) are preferably used in terms of film forming properties, granjan orientation in a good monoodomain state, orientation for a short period of time, stable fixing properties to the glass state, controllability of the helical pitch of cholesteric phases, and forming properties of circularly polarized light separation layers which are thin, light, difficult to vary in the oriented state such as pitch with service temperatures, and excellent in durability and storage stability (Japanese Patent Application No. 7-251818).

(a)

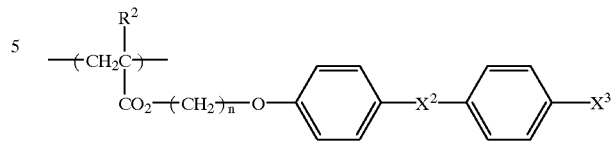

wherein $R^1$ represents hydrogen or a methyl group, m represents an integer of 1 to 6, $X^1$ represents a $CO_2$ group or an OCO group, and p and q each represents an integer of 1 or 2, satisfying p+q=3.

(b)

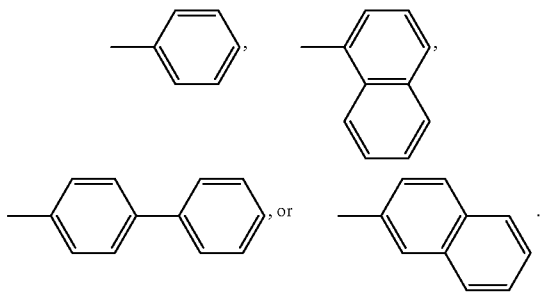

wherein $R^2$ represents hydrogen or a methyl group, n represents an integer of 1 to 6, $X^2$ represents a $CO_2$ group or an OCO group, and $X^3$ represents —CO—$R^3$ or $R^4$, wherein $R_3$ is

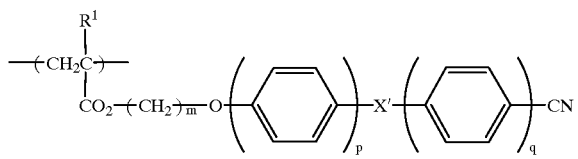

Acrylic monomers which can form the monomer units represented by the above-mentioned general formulas (a) and (b) can be synthesized by appropriate methods. Examples thereof include a method for obtaining a monomer by first heat refluxing ethylene chlorohydrin and 4-hydroxybenzoic acid in an aqueous alkali solution using potassium iodide as a catalyst to obtain a hydroxycarboxylic acid, then subjecting it to a dehydrating reaction with acrylic acid or methacrylic acid to obtain a (meth)acrylate, and esterifying the (meth)acrylate with 4-cyano-4'-hydroxybiphenyl in the presence of dicyclohexyl carbodiimide (DCC) and dimethyl-aminopyridine (DMAP).

Synthesis examples of acrylic monomers belonging to general formula (b) include a method of first heat refluxing a hydroxyalkyl halide and 4-hydroxybenzoic acid in an aqueous alkali solution using potassium iodide as a catalyst to obtain a hydroxycarboxylic acid, then subjecting it to a dehydrating reaction with acrylic acid or methacrylic acid to obtain a (meth)acrylate, and esterifying the (meth)acrylate with phenol having an $R^3$ group-containing CO group at the 4-position in the presence of DCC and DMAP, and a method of esterifying the (meth)acrylate with phenol having an asymmetric carbon atom at the 4-position in the presence of DCC and DMAP, after the above-mentioned dehydrating reaction.

Accordingly, other monomers belonging to the above-mentioned general formulas (a) and (b) can be synthesized in accordance with the above-mentioned methods using appropriate raw materials having desired introduced groups. The above-mentioned phenol having an $R^3$ group-containing CO group at the 4-position can be obtained by, for example, first reacting methyl chloroformate with 4-hydroxybenzoic acid in an aqueous alkali solution to obtain a carboxylic acid, converting it into an acid chloride using oxalyl chloride, reacting the acid chloride with H—$R^3$ in pyridine/tetrahydrofuran to introduce an $R^3$ group, and then treating the resulting product with aqueous ammonia to remove a protective group. Further, the phenol having an asymmetric carbon atom at the 4-position can be obtained, for example, by azeotropic dehydration of 4-hydroxybenzaldehyde and (S)-(-)-1-phenylethylamine in toluene.

The above-mentioned copolymers can be changed in the helical pitch of cholesteric liquid crystals by changing the content of the monomer units represented by general formula (b). Accordingly, the wavelength showing the circularly polarized light dichromatism can be adjusted by controlling the content of the monomer units represented by general formula (b), and optical elements showing the circularly polarized light dichromatism to light in the visible light region can be easily obtained.

The cholesteric liquid crystal polymer layers can be formed by methods based on the conventional orientation treatment. Examples of such methods include a method of developing a cholesteric liquid crystal polymer on an appropriate oriented film such as an oriented film obtained by rubbing with a rayon cloth a polyimide, polyvinyl alcohol, polyester, polyarylate, polyamideimide or polyether imide film formed on a supporting substrate, an obliquely deposited layer or an oriented film obtained by the drawing treatment, followed by heating at a temperature equal to or higher than a glass transition temperature to lower than an isotropic phase transition temperature, and cooling the polymer to a temperature of lower than the glass transition temperature in a state in which liquid crystal polymer molecules are granjan-oriented to obtain a glass state, thereby forming a solidified layer in which the orientation is fixed.

As the above-mentioned supporting substrates, appropriate materials can be used which include monolayer or laminated films composed of plastics such as triacetyl cellulose, polyvinyl alcohol, polyimides, polyarylates, polyesters, polycarbonates, polysulfones, polyethersulfones, amorphous polyolefins, modified acrylic polymers and epoxy resins, and glass plates. The plastic films are preferred in respect to a decrease in thickness, and it is preferred that the retardation change by birefringence is as small as possible in terms of an improvement in the efficiency for light utilization by prevention of changes in a polarized state.

The liquid crystal polymers can be developed, for example, by methods in which solutions of the liquid crystal polymers in solvents are developed in thin layers by appropriate methods such as spin coating, roll coating, flow coating, printing, dip coating, cast film formation, bar coating and gravure printing, followed by drying as needed. As the above-mentioned solvents, appropriate solvents such as methylene chloride, cyclohexanone, trichloroethylene, tetrachloroethane, N-methylpyrrolidone and tetrahydrofuran can be used.

The liquid crystal polymers can also be developed by methods in which heated melts of the liquid crystal polymers, preferably heated melts showing isotropic phases, are developed in accordance with the above, further developed in thin layers while maintaining the melting temperature if necessary, and then solidified. These methods use no solvents, and therefore provide hygienic working environment.

The heating treatment for orienting developed layers of the liquid crystal polymers can be conducted by heating the layers within the temperature range from the glass transition temperature to the isotropic phase transition temperature, namely within the temperature range in which the liquid crystal polymers exhibit liquid crystal phases, as described above. Further, the oriented state can be fixed by cooling the layers to less than the glass transition temperature, and there is no particular limitation on the cooling conditions. Usually, the above-mentioned heat treatment can be conducted at a temperature of 300° C. or less, so that the natural cooling system is generally employed.

The solidified layers of the liquid crystal polymers formed on the supporting substrates can be used either as integrated with the supporting substrates or as films separated therefrom. When the solidified layers are used as integrated with the supporting substrates, the solidified layers of the liquid crystal polymers are laminated with each other in the close contact state, thereby obtaining the circularly polarized light separation layers used in the present invention. When the solidified layers are formed as integrated with the supporting substrates as described above, the retardation of the supporting substrates used is preferably as small as possible in respect to prevention of changes in the state of polarized light.

The thickness of each cholesteric liquid crystal polymer is preferably 0.5 to 50 $\mu$m, more preferably 1 to 30 $\mu$m. and most preferably 2 to 10 $\mu$m, in terms of prevention of disorder of orientation and a reduction in transmittance. When the supporting substrates are contained, the total thickness including the substrates is preferably 2 to 500 $\mu$m, more preferably 5 to 300 $\mu$m, and most preferably 10 to 200 $\mu$m. When the circularly polarized light separation layers are formed, various additives such as stabilizers, plasticizers and metals can be added to the cholesteric liquid crystal polymers as needed.

The circularly polarized light separation layers used in the present invention may show the continuous wavelength region of reflected light or the discontinuous wavelength region of reflected light, based on changes in helical pitch in the direction of thickness. In the case of the latter, the region showing the continuous wavelength region of reflected light may be mingled therewith. The cholesteric liquid crystal polymer layers laminated with each other by the above-mentioned heat pressing operation or volatile liquid intervening operation usually exhibit wavelength region characteristics obtained by only adding the reflected wavelength regions based on the respective cholesteric liquid crystal polymer layers. Accordingly, when the reflected wavelength regions based on the respective cholesteric liquid crystal polymer layers laminated with each other are not overlapped, the circularly polarized light separation layers showing the discontinuous wavelength region of reflected light are obtained.

The circularly polarized light separation layers which can be preferably used in the present invention are layers showing the continuous wavelength region of reflected light in respect to achievement of good color characteristics such as black and white in liquid crystal display. Such a circularly polarized light separation layer can be produced, for example, by heating a laminated product of the cholesteric liquid crystal polymers formed by the above-mentioned heat pressing operation or volatile liquid intervening operation at a temperature equal to or higher than the glass transition temperature to lower than the isotropic phase transition temperature to form a layer in which the cholesteric liquid crystal polymers forming upper and lower layers are mixed with each other in a close contact interface thereof.

In the above, the cholesteric liquid crystal polymer layer formed by mixing the cholesteric liquid crystal polymers of the upper and lower layers forms the circularly polarized light separation layer in which the upper layer differs from the lower layer in helical pitch and the helical pitch varies in multiple stages in the direction of thickness. Usually, the helical pitch is a mean value for the cholesteric liquid crystal polymers forming the upper and lower layers, and the cholesteric liquid crystal polymer layer forms the region showing the continuous wavelength region of reflected light, together with the upper and lower layers.

Accordingly, when the cholesteric liquid crystal polymer layers are used in such a combination that the wavelength region of the upper layer does not overlap with that of the lower layer, namely, in such a combination that the wavelength region of reflected light has a missing region due to discontinuity, the cholesteric liquid crystal polymer layers formed by mixing the upper and lower layers can fill up the above-mentioned missing region to make the wavelength of reflected light continuous. Accordingly, for example, the use of two kinds of cholesteric liquid crystal polymer layers having reflected wavelength regions of 500 nm or less and equal to or more than 600 nm, respectively, can provide a circularly polarized light separation layer which reflects light in the wavelength region of 500 to 600 nm, the discontinuous reflected wavelength region. This means that the circularly polarized light separation layer showing a wider reflected wavelength region can be formed by lamination of less cholesteric liquid crystal polymer layers.

In the present invention, for the visible light region, the use of the circularly polarized light separation layer in which the zone of the reflected wavelength region extends to the near ultraviolet region or the near infrared region is preferred in respect to an improvement in brightness of a liquid crystal display. The reason for this is considered to be that when light is obliquely transmitted through the circularly polarized light separation layer and elliptically polarized, the light is converted in wavelength to light in the visible light region, thereby increasing the amount of visible light.

Figure 2:
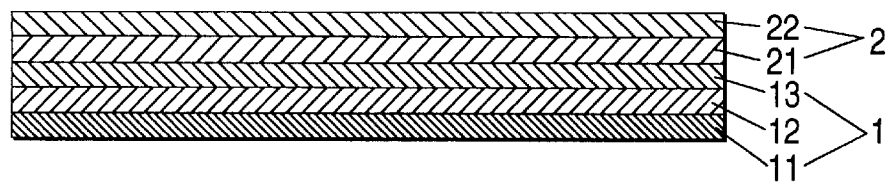
FIG. 2 is a cross sectional view showing another polarizer embodying the present invention.

As the retardation layer, at least the ¼ wavelength plate 21 is used, as shown in FIG. 1, for linearly polarizing circularly polarized light transmitted through the circularly polarized light separation layer, and the compensation plate 22 is used if necessary, as shown in FIG. 2. Further, the retardation layer is arranged on the side of the cholesteric liquid crystal polymer layer in which the center wavelength of reflected light is longer, in the circularly polarized light separation layer. This reduces the angle dependence of changes in color caused by visual angle changes. It is considered that the elliptically polarized light obliquely transmitted through the circularly polarized light separation layer contains light components greatly different in the direction of polarization and ellipticity, and deviates from the axial angle of the polarizing plate when converted to the linearly polarized light through the ¼ wavelength plate, resulting in changes in wavelength (changes in color). In this case, from the characteristics of Bragg reflection of the cholesteric liquid crystal polymer layers, light in the near infrared region becomes light in the visible light region when obliquely seen. It is therefore considered that the ¼ wavelength plate is arranged on such a position that the center wavelength of the reflected light is far away from the cholesteric liquid crystal polymer layer short in wavelength, thereby inhibiting the coloring of the oblique visual angle.

As the ¼ wavelength plate (retardation layer) disposed on the circularly polarized light separation layer, a plate having an in-plane retardation of 100 to 180 nm is preferably used for the visible light region from the viewpoint of the linear polarization effect. That is to say, taking a maximum inplane refractive index as $n_x$, a refractive index in a direction crossing at right angles thereto as $n_y$, a refractive index in a thickness direction as $n_z$, and a thickness as d, a ¼ wavelength plate satisfying the equation: $(n_x-n_y)d=\Delta nd=100-180$ is preferably used.

According to the above, the circularly polarized light vertically transmitted through the circularly polarized light separation layer can be linearly polarized without changes in color to provide light easily transmittable through the polarizing plate without absorption loss, and the phase of the light obliquely transmitted through the circularly polarized light separation layer and elliptically polarized can be compensated to decrease changes in color, thereby giving neutral tints with little coloring when visually observed through the polarizing plate.

In order to highly compensate changes in color caused by the visual angle based on the birefringence of the circularly polarized light separation layer and further changes in color caused by the visual angle based on the birefringence of the liquid crystal cell to prevent coloring, thereby obtaining a liquid crystal display excellent in contrast and visibility such as black and white display, the $\Delta$nd of the ¼ wavelength plate preferably used is 100 to 180 nm, and preferably 110 to 170 nm.

In respect to the above-mentioned prevention of coloring, a ¼ wavelength plate is preferably used in which the refractive index in the direction of thickness is higher than at least one of the in-plane refractive indexes ($n_x<n_z$ or $n_y<n_z$), particularly, the refractive index in the direction of thickness is higher than the mean inplane refractive index ($\{n_x+n_y\}/2<n_z$) or higher than all the in-plane refractive indexes ($n_x<n_z$ and $n_y<n_z$).

As the compensation plate disposed on the ¼ wavelength plate as needed, a compensation plate having a front retardation of 100 to 720 nm is used. That is to say, in accordance with the above-mentioned ¼ wavelength plate, a compensation plate satisfying the equation: $(n_x-n_y)d=\Delta nd=100-720$ is used. This allows the color balance of light obliquely transmitted through the ¼ wavelength plate to agree with the color balance of light vertically transmitted therethrough as close as possible, thereby giving neutral tints with less coloring when visually observed through the polarizing plate.

In terms of the agreement of the color balance of light transmitted through the ¼ wavelength plate and further the compensation of changes in color caused by the visual angle based on the birefringence of the liquid crystal cell, the $\Delta$nd of the compensation plate preferably used is 110 to 700 nm, and preferably 120 to 600 nm. Further, in respect to the above, the compensation plate is preferred in which the refractive index in the direction of thickness is higher than at least one of the in-plane refractive indexes, particularly higher than the mean in-plane refractive index or all the inplane refractive indexes.

The ¼ wavelength plates and compensation plates which can be more preferably used for the compensation of changes in color are ones small in deviation of light axes in planes, preferably having a deviation of ±5 degrees or less, and more preferably ±3 degrees or less. Further, $N_z$ represented by the equation: $(n_x-n_z)/(n_x-n_y)$ is 5 or less, preferably 2 or less, and more preferably 1.5 or less (all include minus values).

The ¼ wavelength plates and compensation plates can be formed of any materials as long as they exhibit the above-mentioned characteristics, and preferred are ones excellent in transparency, particularly showing a light transmittance of 80% or more, and giving an uniform retardation. In general, there are used oriented films and liquid crystal polymers, particularly liquid crystal polymers of twisted orientation, formed of plastics such as polycarbonates, polyesters, polysulfones, polyethersulfones, polystyrene, polyolefins such as polyethylene and polypropylene, polyvinyl alcohol, cellulose acetate polymers, polyvinyl chloride, polyvinylidene chloride, polyarylates, polymethyl methacrylate and polyimides.

The ¼ wavelength plates and compensation plates high in refractive index can be produced by appropriate methods, for example, monoaxial or biaxial heat orientation of films formed by extruding the above-mentioned polymers by appropriate systems such as casting methods and extrusion methods, in the state where the films are adhered to heat-shrinkable films.

The above-mentioned characteristics such as Δnd and $N_z$ of the ¼ wavelength plates and the compensation plates can be controlled by changing the materials or the thickness of the films, or the conditions such as the degree of orientation or the orienting temperature. The general thickness of the ¼ wavelength plates and the compensation plates is 10 to 500 μm, and preferably 20 to 200 μm, for monolayer ones, but is not limited thereto.

When the ¼ wavelength plates and compensation plates are formed by use of liquid crystal polymers, they can be obtained in appropriate forms such as oriented films of the liquid crystal polymers and oriented layers thereof supported by transparent substrates, in accordance with the case of the above-mentioned circularly polarized light separation layers. When the liquid crystal polymers are used, the desired ¼ wavelength plates and compensation plates can also be obtained without orientation treatment.

The ¼ wavelength plates and compensation plates may be either monolayer retardation layers or laminated products of two or more retardation layers different in retardation. The lamination of the retardation layers different in retardation is effective for the enlargement of the wavelength range in which they function as the desired ¼ wavelength plates and compensation plates. When the retardation layers or compensating layers are laminated, it is preferred from the above-mentioned viewpoint that one or more retardation layers or compensating layers in which the refractive index in the direction of thickness is higher than at least one of the inplane refractive indexes are arranged.

Further, from the above-mentioned objects of the present invention such as prevention of changes in color, it is preferred that the compensation plate disposed on the ¼ wavelength plate is arranged so that when the ¼ wavelength plate linearly polarizes circularly polarized light transmitted through the circularly polarized light separation layer, an oscillating direction of the linearly polarized light is parallel to a slow axis or a fast axis of the compensation plate.

Figure 3:
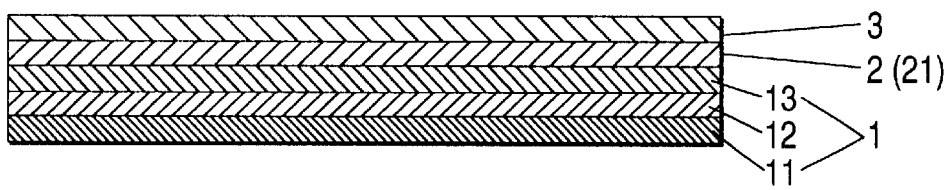
FIG. 3 is a cross sectional view showing a further polarizer embodying the present invention.
Figure 4:
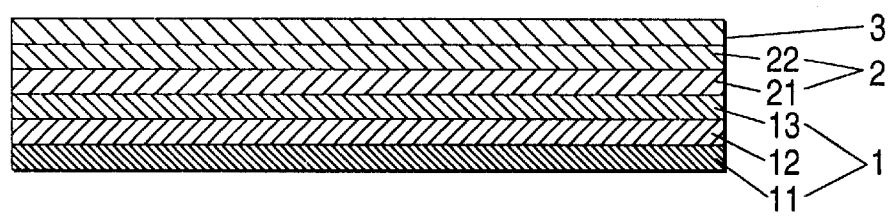
FIG. 4 is a cross sectional view showing a still further polarizer embodying the present invention.

In the polarizer of the present invention, a polarizing plate 3 can also be arranged on a retardation layer 2 comprising a ¼ wavelength plate 21 and further a compensation plate 22, as shown in FIGS. 3 and 4. In this case, the polarizer can be applied to the liquid crystal cell as such without use of a separate polarizing plate.

As the polarizing plates, appropriate plates such as absorption type polarizing plates containing dichroic substances, oriented polyene films and said films provided with transparent protective layers can be used. By the way, examples of the absorption type polarizing plates include hydrophilic polymer films such as polyvinyl alcohol films, partially formalized polyvinyl alcohol films and partially saponified ethylene-vinyl acetate copolymer films, and films allowed to adsorb dichroic substances such as iodine and dichroic dyes and oriented. Further, examples of the oriented polyene films include dehydrated products of polyvinyl alcohol, and dehydrochlorinated products of polyvinyl chloride. The thickness of the polarizing plates is usually 5 to 80 μm, but is not limited thereto.

In the fabrication of the liquid crystal displays, polarizing plates high in the degree of polarization such as absorption type polarizing plates containing dichroic substances are preferably used for attaining bright display using the polarizers according to the present invention, namely transmitting light highly linearly polarized by means of the retardation layers through the polarizers while preventing absorption loss as effectively as possible to obtain display of a good contrast ratio by incidence of the highly linearly polarized light to the liquid crystal cells.

In particular, dichroic substance-containing absorption type polarizing plates having a light transmittance of 40% or more and a degree of polarization of 95.0% or more, particularly 99% or more are preferably used. The above-mentioned degree of polarization (P) is defined by the equation: $P=SQR[(T_p-T_c)/(T_p+T_c)]$, wherein $T_p$ is a light transmittance at the time when the same polarizing plates are arranged in parallel nicol, and $T_c$ is a light transmittance at the time when the polarizing plates are arranged in crossed nicol.

The above-mentioned transparent protective layers are provided particularly for the purpose of protecting polarizing plates poor in water resistance such as the dichroic substance-containing absorption type polarizing plates, and may be formed by appropriate systems such as coating of plastics and lamination of films. When the protective layers are formed by separated materials such as films, it is preferred from the viewpoint of prevention of reflection loss that the polarizing plates are integrally laminated with them by means of adhesive layers. The thickness of the transparent protective layers, which may be appropriately determined, is generally 1 mm or less, preferably 500 μm or less, and more preferably 1 to 300 μm. As the plastics, appropriate plastics may be used. However, the plastics illustrated in the above-mentioned retardation layers and transparent substrates for supporting the liquid crystal polymers are generally used.

Further, fine unevenness can also be formed on surfaces of the transparent resin layers by addition of fine particles.

As the fine particles, particles showing transparency in transparent resin layers are used. Examples of such fine particles include inorganic fine particles having a mean particle size of 0.5 to 5 μm, which may be conductive, such as silica, alumina, titania, zirconia, tin oxide, indium oxide, cadmium oxide and antimony oxide, and organic fine particles such as crosslinked or non-crosslinked polymers. The content of the fine particles is generally 2 to 25% by weight, and preferably 5 to 20% by weight.

When the polarizing plate is disposed on the retardation layer, the arrangement angle of a polarization axis of the polarizing plate to a fast axis or a slow axis of the retardation layer or compensation plate can be appropriately determined according to retardation characteristics of the retardation layer or compensation plate, or characteristics of circularly or linearly polarized light incident thereon. However, in terms of an improvement in the efficiency for light utilization, it is preferred that a transmitting axis of the polarizing plate is arranged in as parallel as possible to a polarizing direction (oscillating direction) of the linearly polarized light through the retardation layer.

The polarizer of the present invention can separate light from a light source such as natural light into right circularly polarized light and left circularly polarized light by reflection and transmission through the circularly polarized light separation layer, linearly polarize the circularly polarized light and elliptically polarized light transmitted through the circularly polarized light separation layer by means of the retardation layer, and control the retardation of the linearly polarized light, particularly light obliquely transmitted through the retardation layer, by means of the compensation plate as needed to supply light to the polarizing plate with small changes in color.

Figure 5:
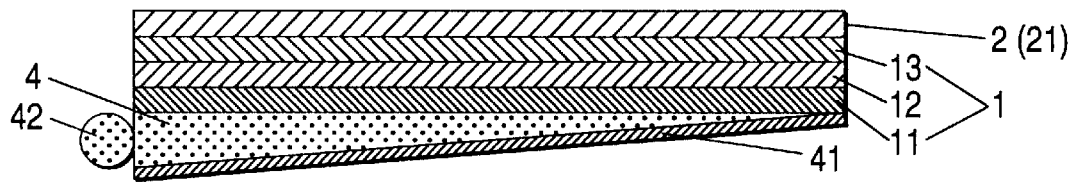
FIG. 5 is a cross sectional view showing a lighting device embodying the present invention.
Figure 6:
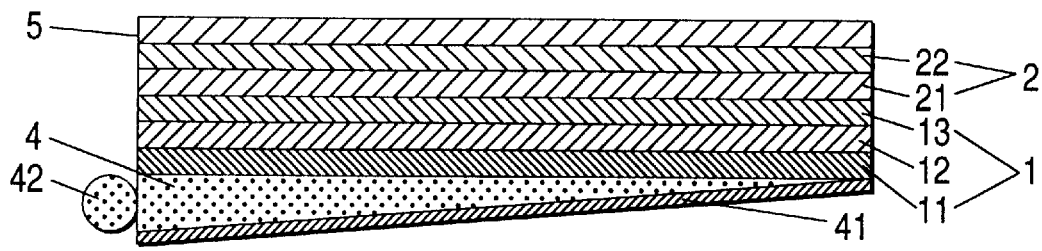
FIG. 6 is a cross sectional view showing another lighting device embodying the present invention.

Accordingly, as shown in FIGS. 5 and 6, the polarizer is arranged on an appropriate surface light source 4 such as a side light type light conductive plate or an EL lamp, directing the side of the circularly polarized light separation layer 1 of the polarizer to the surface light source, thereby being able to assemble a lighting device suitable for a back light of a liquid crystal display. The surface light source illustrated in the figures is provided with a light source 42 on the side of the light conductive plate 4.

According to the above-mentioned lighting device illustrated in the figures, light from the light source 42 is incident on a side face of the light conductive plate 4 and goes out from a surface of the light conductive plate by reflection at a back face. The outgoing light is transmitted as specified circularly polarized light (vertical) or elliptically polarized light (oblique) through the circularly polarized light separation layer 1 arranged on the surface side of the light conductive plate, linearly polarized through a ¼ wavelength plate 21 (retardation layer 2), and transmitted through a compensation plate 22 as needed, thus being incident on a polarizing plate 3. On the other hand, light reflected by the circularly polarized light separation layer 1 as circularly polarized light other than the specified is incident on the light conductive plate again, reflected by means of a reflecting layer 41 arranged on the back face, and incident on the circularly polarized light separation layer 1 again as return light.

The above-mentioned light reflected by the circularly polarized light separation layer is changed in the polarized state when reflected by the back face of the light conductive plate, and converted to specified circularly polarized light which can be partly or wholly transmitted through the circularly polarized light separation layer. Accordingly, the light reflected by the circularly polarized light separation layer is confined between the circularly polarized light separation layer and the light conductive plate until it becomes the specified circularly polarized light which can be transmitted through the circularly polarized light separation layer, and reflection is repeated therebetween.

As described above, in the side light type light conductive plate, the reflected light is confined between the circularly polarized light separation layer and the reflecting layer of the light conductive plate, and reflection is repeated therebetween. In the meantime, the polarized state is changed to the state that the light can be transmitted through the circularly polarized light separation layer, and the light goes out together with initial transmitted light of the incident light, thereby decreasing unused light due to reflection loss.

On the other hand, light goes out from the circularly polarized light separation layer is converted to linearly polarized light or elliptically polarized light rich in linearly polarized light components through the retardation layer. The converted light is little absorbed by and transmitted through the polarizing plate, when the linearly polarized light direction thereof agrees with the transmitting axis of the polarizing plate, thereby reducing unused light due to absorption loss. As a result, the light which has previously been lost as reflection loss and absorption loss can also be effectively used, and the efficiency for light utilization can be improved. As the surface light source, therefore, the side light type light conductive plate is preferably used.

As the above-mentioned light conductive plate, an appropriate one having a reflective layer on a back face and giving out light to the surface side can be used. Preferably, a light conductive plate effectively giving out light without absorption is used. An example thereof is a side light type back light known in a liquid crystal display, in which a linear light source such as a (cold or hot) cathode tube or a light source such as a light emitting diode is arranged on the side face of a light conductive plate 4, and light transmitted through the light conductive plate goes out to the surface side of the plate by diffusion, reflection, diffraction and interference.

In the above, the light conductive plate in which internal transmitted light goes out to one face side can be obtained, for example, by providing a light outgoing face or a back face of a transparent or translucent resin plate with a diffuser in the dot or stripe form, or giving an uneven structure, particularly a fine prism array-like uneven structure, to the back face of the resin plate.

The light conductive plate giving out light to the one face side can have the function that the plate itself converts the polarization of light reflected by the circularly polarized separation layer. However, the provision of the reflecting layer 41 on the back face of the light conductive plate can prevent reflection loss almost completely. The reflecting layer such as a diffusion reflecting layer or a mirror reflecting layer is excellent in the function to convert the polarization of light reflected by the circularly polarized separation layer, so that it is preferably used in the present invention.

By the way, in the diffusion reflecting layer represented by the uneven surface, the polarized state is randomly mixed based on its diffusion to cancel the polarized state. Further, in the mirror reflecting layer represented by a deposited layer of aluminum or silver, a resin plate provided therewith or a metal surface composed of metal foil, the polarized state is reversed by reflection of the circularly polarized light.

In the fabrication of the lighting device, a prism array layer 5 comprising a prism sheet for controlling the outgoing direction of light, a diffusing plate for obtaining uniform light emission, a reflecting means for returning leakage light, and an auxiliary means such as a light source holder for guiding outgoing light to the side face of the light conductive plate are arranged on the top, bottom or side face of the light conductive plate 4 in one or more layers as an appropriate combination if necessary.

In the above, dots given to the prism array layer or the diffusing plate arranged on the surface side of the light conductive plate or given to the light conductive plate can function as a polarization-converting means changing the phase of reflected light by the diffusion effect. When two or more prism layers are arranged, it is preferred that prism arrays in each layer are arranged in the state where the optical anisotropy is canceled by allowing the prism arrays to cross at right angles or intersect each other to shift the arrangement angle of the arrays.

In the present invention, respective parts such as the circularly polarized separation layers, the retardation layers, the polarizing plates and the light conductive plates for fabricating the polarizers or the lighting devices can be integrally laminated by means of adhesive layers as needed. The integral lamination of the fabrication parts is effective for prevention of deterioration of indicated quality due to inhibition of reflection loss in each interface and prevention of invasion of foreign materials in each interface, and prevention of a reduction in compensating efficiency or polarization-converting efficiency caused by optical deviation. Accordingly, even when the circularly polarized separation layers, the retardation layers, the polarizing plates and the light conductive plates are each formed in a plurality of layers, it is preferred that the respective layers are integrated in the close contact state by means of the adhesive layers.

Although appropriate adhesives can be used for the above-mentioned integral lamination, adhesive layers excellent in stress relaxation can be preferably used, among others, because they inhibit stress developed in the circularly polarized separation layers, the retardation layers or the polarizing plates by heat from light sources to prevent changes in the refractive index generated by photoelastic deformation, thereby fabricating liquid crystal displays which are bright and excellent in visibility and reliability of indicated quality.

In the formation of the adhesive layers, transparent adhesives excellent in stress relaxation can be used, the adhesives comprising appropriate polymers such as acrylic polymers, silicone polymers, polyesters, polyurethanes, polyethers and synthetic rubber. In particular, acrylic adhesives are preferably used in terms of optical transparency, adhesive characteristics and weather resistance. In order to prevent photoelastic deformation by relaxation of internal stress developed in laminated products by heat, it is preferred that the adhesive layers have a relaxation elasticity of $2 \times 10^5$ to $1 \times 10^7$ dyne/cm$^2$, particularly $2 \times 10^{6}$ to $8 \times 10^{6}$ dyne/cm$^2$.

Specific examples of the acrylic polymers for forming the above-mentioned acrylic adhesives include polymers of one or more kinds of acrylates and methacrylates having alkyl groups such as methyl, ethyl, n-propyl, isopropyl, n-butyl, isobutyl, pentyl, isoamyl, hexyl, heptyl, cyclohexyl, 2-ethylhexyl, octyl, isooctyl, nonyl, isononyl, lauryl, dodecyl, decanyl and isodecanyl, particularly alkyl groups each having 2 to 14 carbon atoms.

In the preparation of the above-mentioned acrylic polymers, monomers for modification copolymerizable with (meth)acrylates can also be used as needed. Specific examples thereof include hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcyclohexyl) methyl acrylate, carboxyl group-containing monomers such as acrylic acid, methacrylic acid, carboxyethyl acrylate, carboxypentyl acrylate, itaconic acid, maleic acid and crotonic acid, acid anhydride monomers such as maleic anhydride and itaconic anhydride, sulfonic acid group-containing monomers such as 2-acrylamido-2-methylpropanesulfonic acid, phosphoric acid group-containing monomers such as 2-hydroxyethylacryloyl phosphate, amide monomers such as (meth)acrylamide and N-substituted (meth)acrylamide, maleimide monomers such as N-cyclohexylmaleimide N-isopropylmaleimide, N-laurylmaleimide and phenylmaleimide, itaconimide monomers such as N-methylitaconimide, N-ethylitaconimide, N-butylitaconimide, N-octylitaconimide, N-2-ethylhexylitaconimide, N-cyclohexylitaconimide and N-lauryl-itaconimide, succinimide monomers such as N-(meth)acryloyl-oxymethylenesuccinimide, N-(meth)acryloyl-6-oxyhexamethylenesuccinimide and N-(meth)acryloyl-8-oxyoctamethylenesuccinimide, vinyl monomers such as vinyl acetate, N-vinyl-pyrrolidone, N-vinylcarboxylic acid amides and styrene, divinyl monomers such as divinylbenzene, diacrylate monomers such as 1,4-butyl diacrylate and 1,6-hexyl diacrylate, acrylate monomers such as glycidyl (meth)acrylate, tetrahydrofurfuryl (meth)acrylate, polyethylene glycol (meth)acrylate, polypropylene glycol (meth)acrylate, fluorine (meth)acrylate and silicone (meth)acrylate, and (meth)acrylates having ester groups different from those of the above-mentioned main component monomers such as methyl (meth)acrylate and octadecyl (meth)acrylate.

Of the above-mentioned monomers for modification, monomers which have functional groups reactive with intermolecular crosslinking agents and therefore are responsible for intermolecular crosslinking, for example, the above-mentioned carboxyl group-containing monomers, acid anhydride monomers, glycidyl (meth)acrylate and hydroxyl group-containing monomers, can be preferably used. Monomers high in crosslinking reactivity such as carboxyethyl acrylate and 6-hydroxyhexyl (meth)acrylate are preferably used among others, because necessary crosslinking can be conducted by copolymerizing comonomers in small amounts, resulting in the difficulty of increasing the relaxation elasticity of the resulting acrylic copolymers.

The acrylic copolymers can be prepared by any appropriate methods such as solution polymerization, emulsion polymerization, bulk polymerization and suspension polymerization. In the polymerization, polymerization initiators can be used if necessary, generally in an amount of 0.001 to 5% by weight of the monomer component. Examples of the polymerization initiators include organic peroxides such as benzoyl peroxide, t-butyl perbenzoate, cumene hydroperoxide, diisopropyl peroxydicarbonate, di-n-propyl peroxydicarbonate, di(2-ethoxyethyl) peroxydicarbonate, t-butyl peroxyneodecanoate, t-butyl peroxypivalate, (3,5,5-trimethylhexanoyl) peroxide, dipropionyl peroxide and diacetyl peroxide.

The polymerization initiators further include azo compounds such as 2,2'-azobisisobutyronitrile, 2,2'-azobis(2-methylbutyronitrile, 1,1'-azobis(cyclohexane-1-carbonitrile), 2,2'-azobis(2,4-dimethylvaleronitrile), 2,2'-azobis(2,4-dimethyl-4-methoxyvaleronitrile), 2,2'-azobis(2-methylpropionate), 4,4'-azobis(4-cyanovaleric acid), 2,2'-azobis(2-hydroxymethylpropionitrile) and 2,2'-azobis[2-(2-imidazoline-2-yl)propane], potassium persulfate, ammonium persulfate and hydrogen peroxide. Furthermore, redox initiators in which the above-mentioned compounds are combined with reducing agents are also used as the polymerization initiators.

The weight average molecular weight of the acrylic polymers used is preferably 100,000 or more, more preferably 200,000 or more, and most preferably 400,000 or more, in respect to wet heat resistance. Further, such acrylic polymers can be crosslinked with intermolecular crosslinking agents if necessary to improve the adhesive characteristics by an increase in molecular weight. Examples of the intermolecular crosslinking agents include multi-functional isocyanate crosslinking agents such as tolylene diisocyanate, trimethylolpropane tolylene diisocyanate and diphenylmethane triisocyanate, and epoxy crosslinking agents such as polyethylene glycol diglycidyl ether, diglycidyl ether and trimethylolpropane triglycidyl ether. Besides, appropriate crosslinking agents such as melamine resin crosslinking agents, metal salt crosslinking agents, metal chelate crosslinking agents and amino resin crosslinking agents can also be used.

The thickness of the adhesive layers may be appropriately determined. In general, it is 1 to 500 µm, preferably 2 to 200 µm, and more preferably 5 to 100 µm, in terms of adhesive strength and a reduction in thickness. The adhesive layers can contain tackifiers such as petroleum resins, rosin resins, terpene resins, cumarone indene resins, phenol resins, xylene resins and alkyd resins, softening agents such as phthalates, phosphates, paraffin chlorides, polybutene and polyisobutylene, or other appropriate additives such as various fillers and antioxidants.

The polarizer obtained by integral lamination is formed by, for example, transferring an adhesive layer provided on a separator formed of a thin sheet such as a film surface-treated with a release agent onto an adhesive face of a circularly polarized light separation layer, pressing a ¼ wavelength plate thereon and further similarly pressing a compensation plate on the ¼ wavelength plate if necessary, or further similarly pressing the adhesive layer on the ¼ wavelength plate or the compensation plate, and arranging and pressing a polarizing plate thereon.

Further, the polarizer can also be formed by transferring an adhesive layer provided on a separator onto an adhesive face of a light conductive plate, arranging and pressing a circularly polarized light separation layer thereon, then similarly transferring an adhesive layer onto the circularly polarized light separation layer, and pressing in turn a ¼ wavelength plate and an optional compensation plate and polarizing plate thereon, or by laminating adherends such as a circularly polarized light separation layer, a retardation layer, a polarizing plate and a light conductive plate by means of adhesive layers previously provided on specified adhesive faces in a specified order, and pressing them together by the press treatment.

In the polarizers and lighting devices according to the present invention, appropriate optical elements such as light diffusing plates can also be arranged on their surfaces or in appropriate positions between layers. In that case, the optical elements may be integrally laminated by means of adhesive layers excellent in stress relaxation as with the polarizers. Such a previously adhering method has the advantage that elements stabler in quality and more excellent in reliability can be obtained than those obtained by the sequentially adhering method in an assembly line.

In the present invention, the circularly polarized separation layers, the retardation layers, the polarizing plates, the light conductive plates, the adhesive layers and other parts such as the optical elements used in the polarizers and lighting devices can also be treated, for example, with ultraviolet ray absorbers such as salicylate compounds, benzophenol compounds, benzotriazole compounds, cyanoacrylate compounds and nickel complex salt compounds to give ultraviolet ray absorbing ability.

As described above, the polarizer of the present invention is used in combination with an appropriate surface light source such as the side light type light conductive plate, prevents reflection loss by converting the polarization of circularly polarized light reflected by the circularly polarized separation layer to reuse it as outgoing light, prevents absorption loss by the polarizing plate by controlling the phase of the outgoing light by means of the retardation layer to convert it to the state where the linearly polarized light components transmittable through the polarizing plate are richly contained, and inhibits changes in color, thereby improving the efficiency for light utilization and the viewing angle with a good visibility.

Accordingly, the polarizers of the present invention can be used in back light systems of liquid crystal displays, because they are excellent in the efficiency for light utilization, can provide light easily transmittable through the polarizing plates, and can easily achieve a large displaying area. In that case, it is preferred that 65% or more, preferably 70% or more of linearly polarized light components transmittable through the polarizing plates as linearly polarized light and elliptically polarized light are contained, in order to utilize light going out from the retardation layers.

Figure 7:
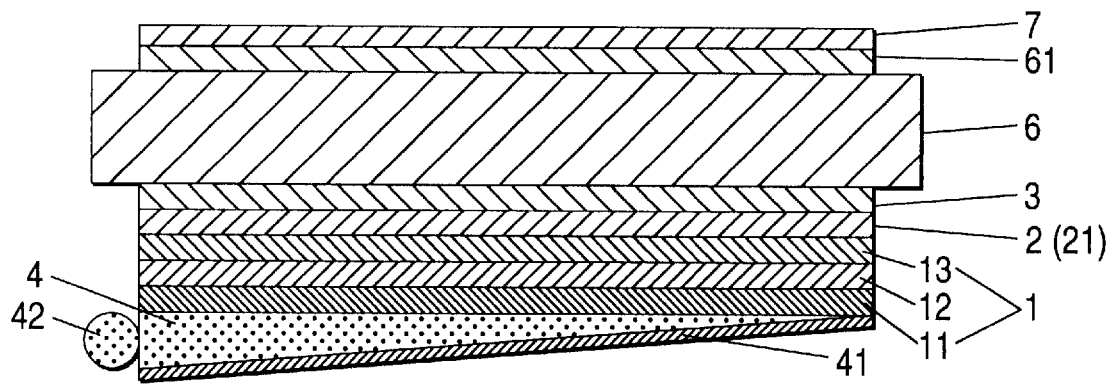
FIG. 7 is a cross sectional view showing a liquid crystal display embodying the present invention.
Figure 8:
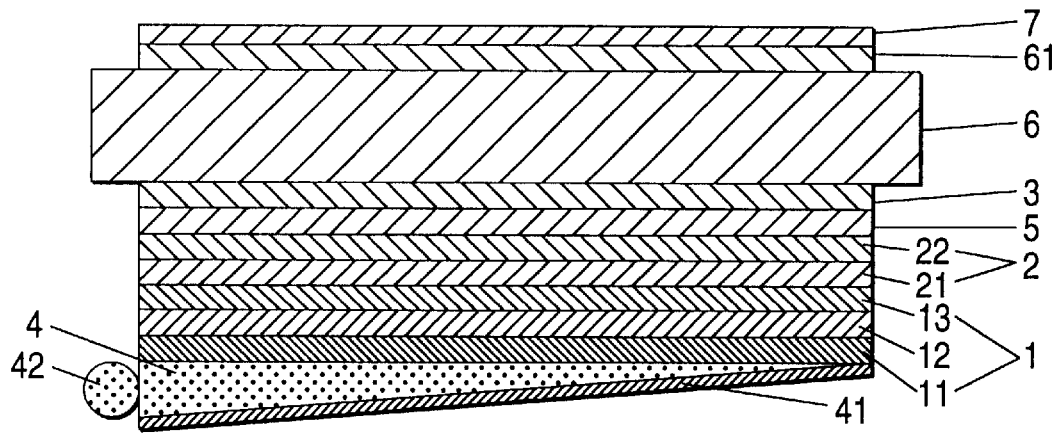
FIG. 8 is a cross sectional view showing another liquid crystal display embodying the present invention.

Embodiments of the liquid crystal displays using the lighting device of the present invention as a back light system are shown in FIGS. 7 and 8. Referring to the drawings, a liquid crystal cell 6 is arranged on the light outgoing side of a light conductive plate 4 forming the lighting device with the interposition of a polarizer, and arranged on the side of a retardation layer 2 of the polarizer as shown in the figures. In the drawings, the reference number 61 indicates a polarizing plate, and the reference number 7 indicates a light diffusing plate for visual light diffusion.

The polarizers and lighting devices of the present invention are particularly preferably used for the fabrication of liquid crystal displays each having the polarizing plates on both sides of the liquid crystal cell. When the polarizer has a polarizing plate on the top side of the retardation layer, the polarizing plate on the side where the polarizer is provided in the liquid crystal cell can be omitted.

Liquid crystal displays are generally fabricated by appropriately assembling constituent parts such as polarizing plates, liquid crystal cells, back lights and optional retardation layers for compensation, and incorporating driving circuits. In the present invention, as described above, there is no particular limitation, except that the polarizer or the lighting device is arranged on the visual back face side of the liquid crystal cell, directing the retardation layer side thereof or the polarizing plate side thereof to the liquid crystal cell, and the liquid crystal display can be produced in accordance with conventional methods. However, it is preferred that the respective constituent parts are integrally adhered to one another by the adhesive layers.

Further, the polarizers and lighting devices of the present invention can be preferably used for liquid crystal cells to which light in the polarized state is required to be incident, such as cells using twist nematic liquid crystals or super twist nematic liquid crystals. However, they can also be used for liquid crystal cells using non-twist liquid crystals, guest host liquid crystals in which dichroic substances are dispersed, or ferroelectric liquid crystals.

In the fabrication of the liquid crystal display, appropriate optical elements such as a light diffusing plate, an anti-glare layer, a reflection reducing film, a protective layer and a protective plate provided on the polarizing plate on the visual side, or a retardation layer for compensation provided between the liquid crystal cell and the polarizing plate on the visual side can be appropriately arranged.

The above-mentioned retardation layer for compensation is provided for compensating the wavelength dependence of birefringence to improve the visibility. In the present invention, it is arranged between the polarizing plate on the visual side and/or the back light side and the liquid crystal cell as needed. As the retardation layer for compensation, an appropriate retardation layer can be used according to the wavelength region, and it may be formed in one layer or as a laminated layer of tow or more layer. The retardation layers for compensation can be obtained as the oriented films or the liquid crystal layers exemplified with respect to the above-mentioned retardation layers.

EXAMPLE 1

A solution of 20% by weight of an acrylic thermotropic cholesteric liquid crystal polymer in tetrahydrofuran was applied onto a surface of a 50-m thick cellulose triacetate film with a wire bar, the surface of which having been rubbing-treated with polyvinyl alcohol (about 0.1 $\mu$m in thickness). After heat orientation at 160° C. for 5 minute, the coated film was cooled at room temperature to form a cholesteric liquid crystal polymer layer having a thickness of 5 $\mu$m. According this method, two kinds of cholesteric liquid crystal polymer layers reflecting left circularly polarized light were formed. The layers had selective reflection wavelength regions of 400 to 470 nm and 600 to 700 nm, respectively, and were different from each other in the mesogen group ratio.

Two kinds of cholesteric liquid crystal polymer layers obtained above were then placed one over the other and introduced between laminating rolls heated at 130° C. to obtain a circularly polarized light separation layer in which the liquid crystal polymer layers were laminated with each other in the close contact state. The reflection characteristics of the circularly polarized light separation layer was the sum of the above-mentioned characteristics of the two kinds of cholesteric liquid crystal polymer layers used, and it was confirmed by observation of cross sections under a TEM that the helical pitch changed stepwise.

A ¼ wavelength plate having a front retardation of 140 nm and an $N_z$ of 1, which was formed of an oriented polycarbonate film, was adhered to the side larger in helical pitch of the above-mentioned circularly polarized light separation layer by means of a 20-μm thick acrylic adhesive layer to obtain a polarizer, and a surface light source was arranged under the circularly polarized light separation layer to obtain a lighting device. The surface light source comprises a 5-mm thick polymethyl methacrylate light conductive plate provided on the back face thereof with a reflection layer having an Al-deposited layer, a 4-mm diameter cold cathode arranged on the side face of the light conductive plate, and an aluminum-deposited film surrounding the side face of the light conductive plate and the cold cathode. This surface light source was disposed under the circularly polarized light separation layer with the interposition of a 20-μm thick acrylic adhesive layer, and integrally laminated therewith by pressing.

EXAMPLE 2

The circularly polarized light separation layer obtained in Example 1 was heated at 130° C. for 10 minutes, and then allowed to cool at room temperature to form a circularly polarized light separation layer. A ¼ wavelength plate having a front retardation of 135 nm and an $N_z$ of 0.5, which was formed of an oriented polycarbonate film, was adhered to the side larger in helical pitch of the above-mentioned circularly polarized light separation layer by means of a 20-μm thick acrylic adhesive layer to obtain a polarizer. Using the polarizer, a lighting device was obtained in accordance with Example 1. The above-mentioned circularly polarized light separation layer reflected left circularly polarized light having a wavelength of 400 to 700 nm, and it was confirmed by observation of cross sections under a TEM that the helical pitch changed stepwise in some portions and continuously in other portions.

EXAMPLE 3

A close contact laminated product reflecting left circularly polarized light was obtained in accordance with Example 1 with the exception that a cholesteric liquid crystal polymer layer having a selective reflection wavelength region of 350 to 430 nm and a cholesteric liquid crystal polymer layer having a selective reflection wavelength region of 680 to 780 nm were used. It was heated at 140° C. for 10 minutes, and cooled at room temperature to form a circularly polarized light separation layer. This circularly polarized light separation layer reflected left circularly polarized light having a wavelength of 400 to 700 nm, and it was confirmed by observation of cross sections under a TEM that the helical pitch changed continuously.

A ¼ wavelength plate having a front retardation of 135 nm and an $N_z$ of −1.0, which was formed of an oriented polycarbonate film, was adhered to the side larger in helical pitch of the above-mentioned circularly polarized light separation layer by means of a 20-μm thick acrylic adhesive layer, and a compensation plate having a front retardation of 270 nm which was formed of an oriented polycarbonate film was further adhered thereto by means of a 20-μm thick acrylic adhesive layer so that a slow axis intersects the ¼ wavelength plate at an angle of 45 degrees, thereby obtaining a polarizer. Using the polarizer, a lighting device was obtained in accordance with Example 1.

COMPARATIVE EXAMPLE 1

A polarizer and lighting device were obtained in accordance with Example 1 with the exception that the ¼ wavelength plate was disposed on the side smaller in helical pitch of the circularly polarized light separation layer.

COMPARATIVE EXAMPLE 2

A polarizer and lighting device were obtained in accordance with Example 2 with the exception that the ¼ wavelength plate was disposed on the side smaller in helical pitch of the circularly polarized light separation layer.

COMPARATIVE EXAMPLE 3

A polarizer and lighting device were obtained in accordance with Example 3 with the exception that the ¼ wavelength plate was disposed on the side smaller in helical pitch of the circularly polarized light separation layer.

EVALUATION TESTS

A polarizing plate was disposed on the light outgoing side of each of the lighting devices obtained in Examples and Comparative Examples, adjusting the axis angle so as to show the maximum brightness, and the brightness in the front (vertical) direction thereof was measured. Then, taking as 100 a front brightness in the state where the lighting device had no polarizer, the ratio to the front brightness was determined. Further, chromaticities in the front direction ($x_0$, $y_0$) and in the oblique direction at 45 degrees ($X_{45}$, $y_{45}$) were measured, and a chromaticity difference therebetween was calculated according to the following equation:

$$\text{Chromaticity Difference} = \sqrt{\{(x_0-x_{45})^2+(y_0-y_{45})^2\}}$$

The results obtained are shown in the Table below:

TABLE

|  | Example | | | Comparative Example | | |
| --- | --- | --- | --- | --- | --- | --- |
|  | 1 | 2 | 3 | 1 | 2 | 3 |
| Front Brightness Ratio | 151 | 153 | 155 | 150 | 153 | 154 |
| Chromaticity Difference | 0.010 | 0.006 | 0.002 | 0.022 | 0.025 | 0.032 |

While the invention has been described in detail and with reference to specific embodiments thereof, it will be apparent to one skilled in the art that various changes and modifications can be made therein without departing from the spirit and scope thereof.

What is claimed is:

1. A polarizer comprising a circularly polarized light separation layer in which two or more cholesteric liquid crystal polymer layers are laminated with each other in a close contact state in a long-short order based on a center wavelength of reflected light, said circularly polarized light separation layer changing in helical pitch in the direction of thickness, and a retardation layer arranged on the long-wavelength side of said center wavelength, wherein the retardation layer comprises a ¼ wavelength plate having a front retardation of 100 to 180 nm, the circularly polarized light separation layer shows a continuous or discontinuous wavelength region of reflected light, based on changes in helical pitch in the direction of thickness, and the region showing the continuous wavelength region of reflected light in the circularly polarized light separation layer is a region having a mixed layer of cholesteric liquid crystal polymers forming the upper and lower layers in a close contact lamination interface of the upper and lower cholesteric liquid crystal polymer layers.

2. The polarizer according to claim 1, wherein one or both of the ¼ wavelength plate and the compensation plate has a refractive index in the direction of thickness higher than one or both of inplane refractive indexes or a mean inplane refractive index.

3. The polarizer according to claim 1, wherein one or both of the ¼ wavelength plate and the compensation plate comprise plastic films or liquid crystal polymer layers.

4. The polarizer according to claim 3 wherein the liquid crystal polymer layer is formed of a liquid crystal polymer of twisted orientation.

5. The polarizer according to any one of claim 2 to 4, wherein the compensation plate is arranged so that when the ¼ wavelength plate linearly polarizes circularly polarized light transmitted through the circularly polarized light separation layer, an oscillating direction of the linearly polarized light is parallel to a slow axis or a fast axis of the compensation plate.

6. A lighting device comprising the polarizer according to claim 1, and a surface light source disposed on the circularly polarized light separation layer side of the polarizer.

7. The lighting device according to claim 6, wherein said device has at least one prism array layer.

8. The lighting device according to claim 7, wherein two or more prism array layers are arranged so that the optical anisotropy is canceled by allowing the prism arrays to intersect each other.

9. A liquid crystal display in which the lighting device according to claim 6 is arranged on the visual back face side of a liquid crystal cell, directing the retardation layer side thereof to the liquid crystal cell.

10. The liquid crystal display according to claim 9, wherein the polarizer or lighting device is integrally laminated with the liquid crystal cell by means of an adhesive layer, and one polarizing plate is provided between the circularly polarized light separation layer and the liquid crystal cell.

11. A liquid crystal display in which the polarizer according to claim 1 is arranged on the visual back face side of a liquid crystal cell, directing the retardation layer side thereof to the liquid crystal cell.

12. The polarizer according to claim 1, wherein the retardation layer further comprises a compensation plate having a front retardation of 100 to 720 nm provided on the ¼ wavelength plate.

13. A polarizer comprising a circularly polarized light separation layer in which two or more cholesteric liquid crystal polymer layers are laminated with each other in a close contact state in a long-short order based on a center wavelength of reflected light, said circularly polarized light separation layer changing in helical pitch in the direction of thickness, and a retardation layer arranged on the long-wavelength side of said center wavelength, wherein the circularly polarized light separation layer shows a continuous or discontinuous wavelength region of reflected light, based on changes in helical pitch in the direction of thickness, and the region showing the continuous wavelength region of reflected light in the circularly polarized light separation layer is a region having a mixed layer of cholesteric liquid crystal polymers forming the upper and lower layers in a close contact lamination interface of the upper and lower cholesteric liquid crystal polymer layers.

* * * * *